(No Model.)

J. A. PERROTTET.
PIPE AND HOSE COUPLING.

No. 285,157. Patented Sept. 18, 1883.

WITNESSES:
C. Neveux
C. Sedgwick

INVENTOR:
J. A. Perrottet
BY Munn & Co
ATTORNEYS.

in
UNITED STATES PATENT OFFICE.

J. ADOLPHE PERROTTET, OF NEW YORK, N. Y.

PIPE AND HOSE COUPLING.

SPECIFICATION forming part of Letters Patent No. 285,157, dated September 18, 1883.

Application filed March 9, 1883. (No model.)

*To all whom it may concern:*

Be it known that I, J. ADOLPHE PERROTTET, of the city, county, and State of New York, have invented a new and Improved Pipe and Hose Coupling, of which the following is a full, clear, and exact description.

The object of my invention is to provide a new and improved coupling of suitable construction for pipes and hose.
Reference is to be had to the accompanying drawings, forming part of this specification, in which similar letters of reference indicate corresponding parts in both the figures.

Figure 1:
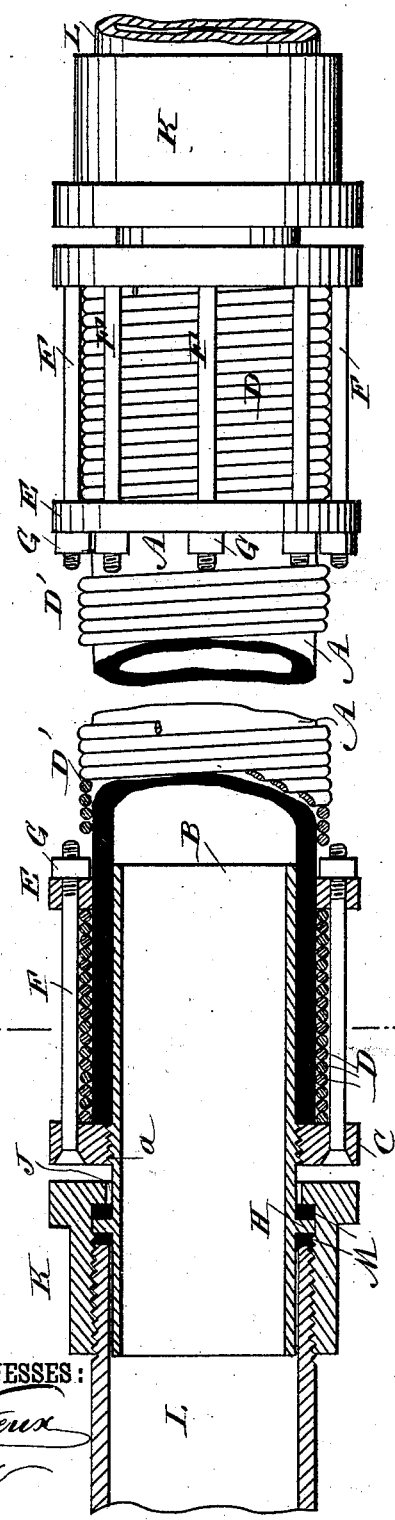
Figure 2:
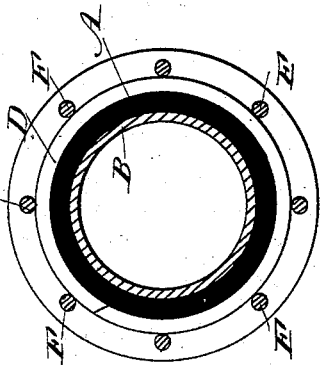

Figure 1 is a longitudinal elevation of my improved pipe-coupling, parts being broken out and others shown in section. Fig. 2 is a cross-sectional elevation of the same.

In each end of a rubber tube, A, a piece of metallic tubing, B, is inserted in such a manner that about half of the length of the tube B projects from the end of the rubber tube A. At the edge of the rubber tubing the metallic tube B is provided at its outer surface with screw-threads a, on which a collar, C, is screwed, against which the end of the rubber tubing abuts. Wires D are coiled firmly around the rubber tubing, to press the same against the inner metallic tubing, B. The said tubing is held in place by a ring, E, resting against the opposite end of the coiled wire—that is, the coil of wire D will be held between the ring C and the ring E, and is pressed firmly between the said rings by means of screw-bolts F, having countersunk ends in the ring C and passing through the ring E, nuts G being screwed on the bolts F on the outer surface of the ring E. By drawing the nuts G up tightly, the coiled wire will be pressed together between the rings C E, and will also be pressed firmly against the rubber. The rubber tube A is surrounded by coiled wire D', between the ends, for the purpose of strengthening the same. That end of the tube B projecting from the end of the rubber tube A is provided a short distance from the ring C with an annular ridge, H, on its outer surface, between which ridge H and the adjoining surface of the ring C the inwardly-projecting end flange, J, of a sleeve or collar, K, passes, surrounding the projecting end of the tube B, and mounted loosely on the same to turn, which sleeve K has its inner surface screw-threaded. The diameter of the sleeve K is so much greater than that of the tube B that the externally-screw-threaded end of the pipe L to be coupled can be passed in between the outer surface of the tube B and the inner screw-threaded surface of the sleeve K. The end of the said tube L is screwed into the sleeve K. Packing-rings M are placed against both side surfaces of the annular ridge H, to insure a close joint.

If a pipe is to be coupled, it is screwed into the collar K, as stated above, the end of the tube B passing into the end of the pipe L, as shown. The end of the tube L then rests against one of the packing-rings M, and leakage is thus prevented. The pipes can be coupled or uncoupled very rapidly by simply turning the collar K, whereby the pipe L will be screwed into the said collar, and the tube B will pass into the pipe L. Both ends of the rubber tube A are provided with the same coupling device.

Having thus fully described my invention, I claim as new and desire to secure by Letters Patent—

1. The combination, with the tube A, the wires, and tube B, of the collar C, screwing thereon, the ring E, and the rods F, to hold the wires close together, as described.

2. The combination, with the tube A, of the tube B, inserted in the end of the same, the ring C, screwed on the tube B, the ring E, surrounding the tube A, the wire D, wound around the tube A between the rings C E, and the bolts F, uniting the rings C E and holding the wire coil in place, substantially as herein shown and described, and for the purpose set forth.

J. ADOLPHE PERROTTET.

Witnesses:
OSCAR F. GUNZ,
C. SEDGWICK.